(12) United States Patent
Platteter et al.

(10) Patent No.: US 7,080,274 B2
(45) Date of Patent: Jul. 18, 2006

(54) SYSTEM ARCHITECTURE AND METHOD FOR SYNCHRONIZATION OF REAL-TIME CLOCKS IN A DOCUMENT PROCESSING SYSTEM

(75) Inventors: Dale T. Platteter, Fairport, NY (US); Judy C. Bosso, Fairport, NY (US); Robert S. Westfall, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 854 days.

(21) Appl. No.: 09/938,237

(22) Filed: Aug. 23, 2001

(65) Prior Publication Data

US 2003/0041274 A1 Feb. 27, 2003

(51) Int. Cl.
*G06F 1/12* (2006.01)
(52) U.S. Cl. ..................................... 713/400
(58) Field of Classification Search ................ 713/400
See application file for complete search history.

(56) References Cited

U.S. PATENT DOCUMENTS

| | | | | |
|---|---|---|---|---|
| 4,190,350 A | * | 2/1980 | Donohue et al. | 399/86 |
| 4,644,498 A | * | 2/1987 | Bedard et al. | 714/3 |
| 4,807,259 A | * | 2/1989 | Yamanaka et al. | 375/358 |
| 5,327,468 A | | 7/1994 | Edblad et al. | |
| 5,535,217 A | * | 7/1996 | Cheung et al. | 709/248 |
| 5,629,775 A | | 5/1997 | Platteter et al. | |
| 5,995,771 A | * | 11/1999 | Miyawaki | 399/8 |
| 6,236,277 B1 | | 5/2001 | Esker | |
| 6,320,424 B1 | * | 11/2001 | Kurd et al. | 327/8 |
| 6,343,351 B1 | * | 1/2002 | Lackman et al. | 711/158 |
| 6,411,795 B1 | * | 6/2002 | Okamoto | 399/401 |
| 6,608,990 B1 | * | 8/2003 | Gonnella et al. | 399/382 |
| 6,675,249 B1 | * | 1/2004 | Shimoda et al. | 710/305 |
| 6,704,302 B1 | * | 3/2004 | Einbinder et al. | 370/352 |

FOREIGN PATENT DOCUMENTS

| | | |
|---|---|---|
| GB | 2337347 A | 11/1999 |
| WO | WO 01/22202 A1 | 3/2001 |

* cited by examiner

*Primary Examiner*—Lynne H. Browne
*Assistant Examiner*—Tse Chen
(74) *Attorney, Agent, or Firm*—Fay, Sharpe, Fagan, Minnich & McKee, LLP

(57) ABSTRACT

A system architecture and method are provided for synchronizing the slave clock of one or more resources with the master clock of a controller in a document processing system. The method includes: a) saving a value of the master clock (615); b) generating a discrete clock synchronization interrupt signal and distributing the interrupt signal to the resource(s) via the control bus (625); c) receiving the interrupt signal at each resource (630) and saving a value of the slave clock (640); d) sending a message to the controller via a network to request the value saved for the master clock (645); e) sending the value to the resource (660); f) receiving the value (665); and g) subtracting the value saved for the slave clock from the value saved for the master clock to determine an error value between the clocks (690) and using the error value in an adjustment algorithm to synchronize the slave clock with the master clock (695).

21 Claims, 6 Drawing Sheets

SYSTEM ARCHITECTURE AND METHOD FOR SYNCHRONIZATION OF REAL-TIME CLOCKS IN A DOCUMENT PROCESSING SYSTEM

BACKGROUND OF THE INVENTION

The present invention relates to a system architecture for a document processing system. It finds particular application in conjunction with synchronization of a real-time clock in one or more modules of a multiple feeding and finishing architecture with a master real-time clock in a controller of the document processing system and will be described with particular reference thereto. However, it is to be appreciated that the present invention is also amenable to other like applications.

In the early days of copiers, copies were fed to a tray where the operator took them and performed manual finishing operations. These manual operations ranged from simple collation and stapling to more sophisticated operations such as folding and inserting in an envelope for mailing. Later products incorporated finishing functionality within the print engine to relieve the operator of these manual finishing functions. Finishing operations included collation, stapling, and binding. The same revolution has also occurred in feeding applications. Operators originally placed the document to be copied on the platen, closed the cover and pushed the start print button. Now, automatic document feeders and recirculating document handlers have become commonplace.

Incorporating feeding and finishing functions within the print engine was well received when collation and stapling were the primary operations. However, customers soon required more and more sophisticated feeding and finishing operations. It became increasingly inefficient to follow a course of developing feeding and finishing functions specific to a single product. Such product development was a very time consuming activity, required enormous resources, and led to duplication of activities. Another issue was the large number of third party vendors with experience in the feeding and finishing technologies. It was a waste of resources to duplicate the off-line feeding and finishing functions currently provided by third party vendors. Under these circumstances, a standard for attaching feeding and finishing devices to print engines was developed by Xerox Corporation ("Xerox"). The standard was used by Xerox for developing new document processing products and by third party vendors for developing feeding and finishing modules. The third party feeding and finishing modules were compatible with Xerox's print engines and other document processing products.

Certain aspects of the standard are described in U.S. Pat. No. 5,629,775 to Platteter et al. ("Platteter '775") and assigned to Xerox, entitled "System Architecture for Attaching and Controlling Multiple Feeding and Finishing Devices to a Reproduction Machine." The basic modular architecture (i.e., multiple feeding and finishing architecture (MFFA)) of an electronic image processing apparatus in Platteter '775 inherently allowed the duplication of effort for developing feeding and finishing capabilities to be avoided by permitting and encouraging third party vendors to develop or adapt feeding and finishing devices that were compatible with standard print engines. More specifically, Platteter '775 permitted the document feeding and/or finishing modules to be interconnected with the print engine in a networked environment and organized in a sequence that meets the customer's needs for a fully automated job. This permitted finishing or feeder devices to be attached in any order that the operator decided was appropriate for the application.

However, feeding and finishing modules in the networked MFFA include clocks that must be accurately synchronized with a master clock in the master module, the print engine, in order to correctly perform the printing function. This is because the master module controls all the scheduling between the feeding and finishing modules. As document processing systems became more sophisticated the accuracy and precision of the synchronization have become more and more important.

Clock synchronization in the networked MFFA was initially implemented to synchronize the clocks within the feeding and finishing modules using only the network. Due to delays in communications over the network, this type of clock synchronization is no longer sufficient. Network delay is particularly a problem when more than several feeding and/or finishing modules are configured in the document processing system. In other words, as more feeding and finishing modules are added to the system, the delay over the network increases, causing the synchronization of the module clocks with the master clock to be unpredictable, thereby unreliable, and often with unacceptable error. Additionally, variability of network delay occurred due to fluctuations in network traffic as the network was used for communications other than clock synchronization.

In the networked MFFA, the clock synchronization algorithm was typically designed with the feeding and finishing modules requesting the current master clock time and master module responding to the request, both via the network. More specifically, the basic algorithm went as follows: 1) First, a slave module (i.e., feeding or finishing module) read and saved the current value of its clock. 2) The slave module then sent a request, over the network, to the master module requesting a read of the master clock. 3) The master module then read its clock and sent the time value back to the slave module over the network. 4) On receipt of the message from the master module, the slave again read the value of its clock. 5) The slave module then subtracted the two readings it had done of its clock and divided the result by two (2) to get one-half of the delay over the network. 6) The slave then added the result (one-half the delay) to the master clock reading sent by the master module. 7) The slave then compared the adjusted master clock time to the last reading it had done of its clock. The comparison determined whether there was error between the two clocks. 8) Finally, the slave module then adjusted its clock appropriately to account for the error.

The problem with this algorithm is that the communications delay over the network is not exactly the same for both directions. Sometimes the request takes longer than the reply and other times the reply takes longer than the request. All the slave can measure is the total time between when the request is made and when the value from the master is received. Unfortunately, the master clock is read sometime in between when the request is made and when the slave module receives the reply. Accordingly, any algorithm that is based solely on network communications will not be accurate because of the inherent variability of network delay. This variability only gets worse when additional feeding and/or finishing modules communicate over the network.

The present invention contemplates a new and improved method for clock synchronization in a networked MFFA configuration of a document processing system that overcomes the above-referenced problems and others.

SUMMARY OF THE INVENTION

In accordance with one aspect of the present invention, a document processing system is provided. The document processing system is comprised of a controller, including a master clock and logic for generating a discrete clock synchronization interrupt signal; a resource, including a slave clock related to operational timing of the resource and circuitry for receiving and processing the discrete interrupt signal; and a control bus, interconnecting the resource and the controller, for distributing the discrete interrupt signal.

In accordance with a more limited aspect of the present invention, a method is provided for initially synchronizing the slave clock with the master clock of the document processing system. The method comprising the steps of: a) saving a value of the master clock in the controller; b) generating a discrete clock synchronization interrupt signal in the controller and distributing the discrete interrupt signal to the resource via the control bus; c) receiving the discrete interrupt signal at the resource and saving a first value of the slave clock; d) sending a message from the resource to the controller via a network to request the value saved for the master clock; e) sending the value saved for the master clock from the controller to the resource via the network; f) receiving the value saved for the master clock at the resource; g) saving a second value of the slave clock in the resource; h) subtracting the first value from the second value to determine a slave clock difference value; and i) adding the difference value to the value saved for the master clock to determine a synchronized value for the slave clock and setting the slave clock to the synchronized value.

In accordance with a more limited aspect of the present invention, a method is provided for synchronizing the slave clock with the master clock during steady state operation of the document processing system. The method comprising the steps of: a) saving a value of the master clock in the controller; b) generating a discrete clock synchronization interrupt signal in the controller and distributing the discrete interrupt signal to the resource via the control bus; c) receiving the discrete interrupt signal at the resource and saving a value of the slave clock, d) sending a message from the resource to the controller via a network to request the value saved for the master clock, e) sending the value saved for the master clock from the controller to the resource via the network; f) receiving the value saved for the master clock at the resource; and g) subtracting the value saved for the slave clock from the value saved for the master clock to determine an error value between the slave clock and the master clock and using the error value in an adjustment algorithm to adjust the slave clock to be synchronized with the master clock.

One advantage of the present invention is that it allows the clocks in resources or slave modules (i.e., feeding or finishing modules) of a document processing system configured in a networked MFFA to be more accurately and precisely synchronized with a master clock within the master module (i.e. print engine or controller) of the system.

Another advantage of the present invention is that the accuracy and precision of clock synchronization in a document processing system configured in a networked environment is independent of the quantity of feeding and finishing modules attached to the network nor is it affected by changes in the level of network traffic.

Another advantage of the present invention is that it supports hard real-time service in a document processing system configured in a networked MFFA.

Another advantage of the present invention is that it can synchronize the slave clock of a module or resource to within one (1) clock cycle of the master clock of the controller in the document processing system.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
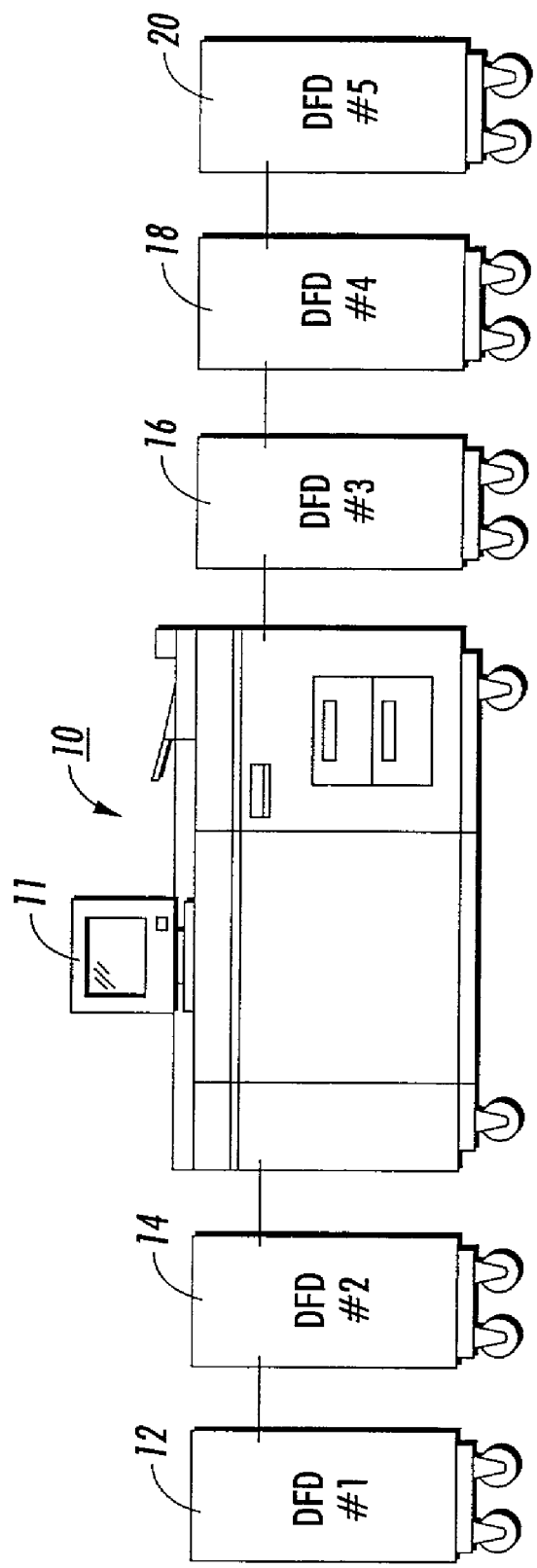
FIG. 1 is a block diagram of a document processing system incorporating the present invention.

In describing the present invention, the following terms have been used:

"Real-time" refers to a type of system where system correctness depends not only on outputs, but the timeliness of those outputs. Failure to meet one or more deadlines can result in system failure.

"Hard real-time service" refers to performance guarantees in a real-time system in which missing even one deadline results in system failure.

"Soft real-time service" refers to performance guarantees in a real-time system in which failure to meet deadlines results in performance degradation but not necessarily system failure.

"Local area network (LAN)" refers to a network of interconnected computers or computer-controlled devices (i.e., nodes) and connection devices (e.g., switches and routers) that spans a relatively small area at a single site. Each node has its own CPU which controls local operations and communications with other nodes on the LAN. LAN connections are through direct cables (e.g., unshielded twisted pair, coaxial cable, or optical fiber). One of the most common LAN standards is referred to as Ethernet.

"Ethernet" refers to a LAN protocol developed by Xerox in cooperation with Digital Equipment Corporation (DEC) and Intel in 1976. Ethernet uses a bus or star topology and supports data transfer rates of 10 megabits per second (Mbps). The Ethernet specification served as the basis for the IEEE 802.3 standard, which specifies the physical and lower software layers.

"10 Base T" refers to a type of cable used to connect nodes on an Ethernet network. 10 refers to the transfer rate used on standard Ethernet, 10 Mbps. Base means that the network uses baseband communication rather than broadband communications; T stands for twisted pair. The 10 Base T standard uses a twisted-pair cable with maximum lengths of 100 meters.

A document processing system can be comprised of multiple modules or resources (i.e., feeding and finishing devices) attached to a print engine. The modules can be added or removed by the user to provide the feeding and/or finishing capabilities they require. The modules must be accurately and precisely synchronized with a master module (i.e., print engine) in order to correctly perform the printing function. The present invention describes a method that allows the control systems within multiple slave modules or resources of a document processing system to be accurately and precisely synchronized with a master clock contained in the master module in order to provide certain performance guarantees. The nature of the performance guarantees that the document processing system must provide can be classified into two broad categories: (1) hard real-time guarantees, when the performance requirements of the system will never be violated and (2) soft real-time guarantees, when the requirements will occasionally, but infrequently, violate the performance requirements.

When providing hard real-time service, the document processing system guarantees apply irrespective of the system functions required to operate simultaneously in order to perform an operation. Consequently, when hard real-time guarantees are required, clock synchronization must be based on the worst-case performance conditions that could be encountered. With soft-real time service, the document processing system cannot guarantee that the performance requirements will be continuously satisfied. Nevertheless, since soft real-time services avoid the worst-case design necessary for hard real-time services, soft real-time services result in a much higher utilization of system resources than hard real-time services. However, the key to the successful deployment of soft real-time services on document processing systems will depend on the effectiveness of the utilization versus performance tradeoffs, which must be conservative enough to ensure that violations of system performance requirements are infrequent, while at the same time ensuring that the system performance is sufficient to make it economically competitive. Depending on the performance required by a particular customer or for a particular operation of the document processing system, the present invention can be implemented for hard real-time service or soft real-time service. Generally, document processing systems are presumed to require hard real-time service. The present invention has been demonstrated to synchronize real-time clocks in slave modules or resources to within one (1) clock cycle of the master clock in the print engine of the document processing system.

With reference to FIG. 1, a document processing system in accordance with the present invention comprises a marking engine or printer with multiple attached feeding and/or finishing devices. In particular, a marking engine or printer 10 including a user interface with screen 11 is interconnected to multiple document feeding devices 12 and 14 and multiple document finishing devices 16, 18, and 20. As is well known, the feeding devices are sources of printable media like paper for providing the printer 10 with stock for completion of the printing process. Feeding devices are paper trays, and the need for feeding devices is to supply an increased level of printable stock selection to the printer. This could be for the purpose of having multiple colors of tabs or separating stock or front and rear cover stock with a clear coversheet. Or it could be a check printing application where there is a variety of scenes preprinted and each is fed in a collated order to build a check book with the proper cover sheets and rear cover stock. The finishing devices can be any suitable devices such as sorters, compilers, staplers, folders, or trimmers. It should be noted that FIG. 1 is only one embodiment and meant to illustrate a functional view of the devices rather than actual physical placement.

The feeding and finishing devices (12, 14, 16, 18, 20) may be referred to collectively as resources with respect to the marking engine or printer 10 (i.e., print engine) of the document processing system. The resources are physically attached to the print engine 10 such that sheets can be fed into the print engine 10 from the feeding devices (12, 14) and sheets or sets of sheets can be transferred from the print engine 10 to the finishing devices (16, 18, 20). The resources are attached to each other such that sheets or sets of sheets can be transferred from one device to another. It should be understood that the mechanical specifications of how these resources are connected to the print engine 10 or to one another are not part of the present invention.

Figure 2:
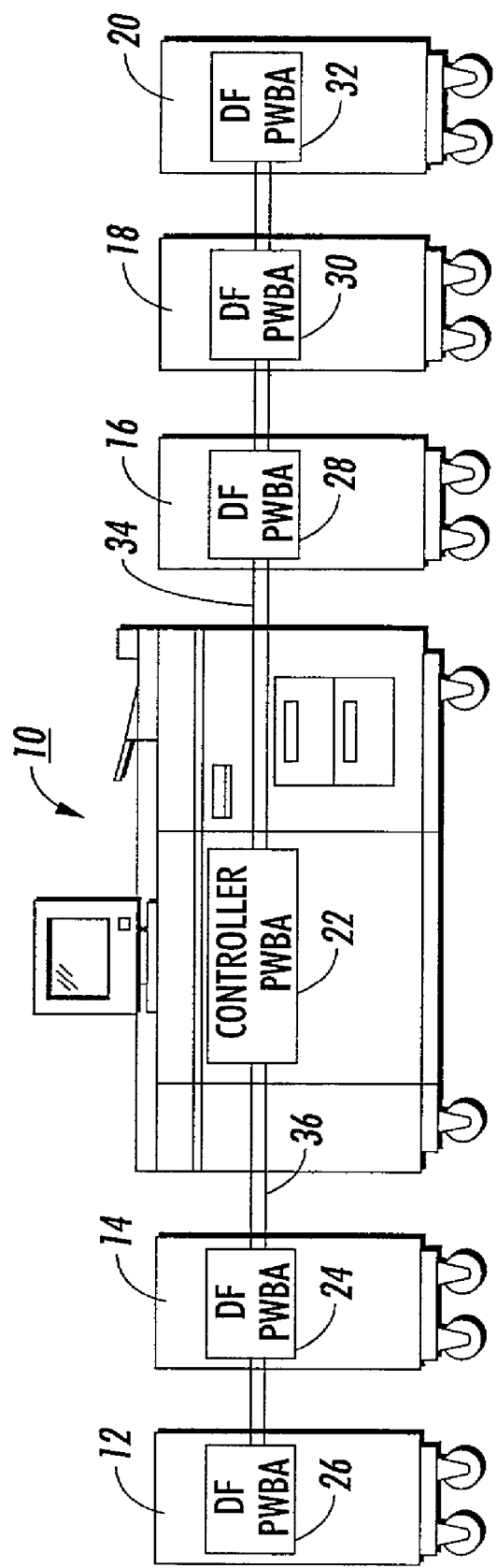
FIG. 2 is an electrical interconnection diagram of the document processing system of FIG. 1.

With reference to FIG. 2, the basic electrical interconnections of the document processing system of FIG. 1 are shown. The electrical interconnections depicted in FIG. 2 include a system network 34 (e.g., LAN) and a control bus 36. It should be noted that the architecture of FIG. 2 is modular and can include any combination of resources. The architecture allows expansion to include additional resources, while less resources than the configuration of five (5) shown in FIG. 2 are also permitted under the present invention. The preferred embodiment of the present invention uses a 10 Base T Ethernet network with nodes connected in a star topology. However, alternate topologies, alternate cabling standards, and alternate network protocol standards that are able to implement synchronization of real-time clocks as described below are also contemplated.

Continuing to refer to FIG. 2, printed wiring board assembly (PWBA) 26 of feeding device 12 is connected to the system network 34 and the control bus 36. Likewise, PWBA 24 of feeding device 14, controller PWBA 22 of the print engine 10, PWBA 28 of finisher device 16, PWBA 30 of finisher device 18, and PWBA 32 of finisher device 20 are also connected to the system network 34 and the control bus 36. Controller PWBA 22 is also commonly referred to as a controller. Each resource PWBA (24, 26, 28, 30, 32) provides several functions. One is to provide an interface to the system network 34; another function is local control of the resource (12, 14, 16, 18, 20). The resource PWBA (24, 26, 28, 30, 32) contains all the software needed to integrate the resource (12, 14, 16, 18, 20) into the chain of resources controlled by the print engine and forming the document processing system 10. The communications portion of the software on the resource PWBA (24, 26, 28, 30, 32) is common on every PWBA in each of the devices. In addition there is software on the board that is used to control the specific resource (12, 14, 16, 18, 20).

Figure 3:
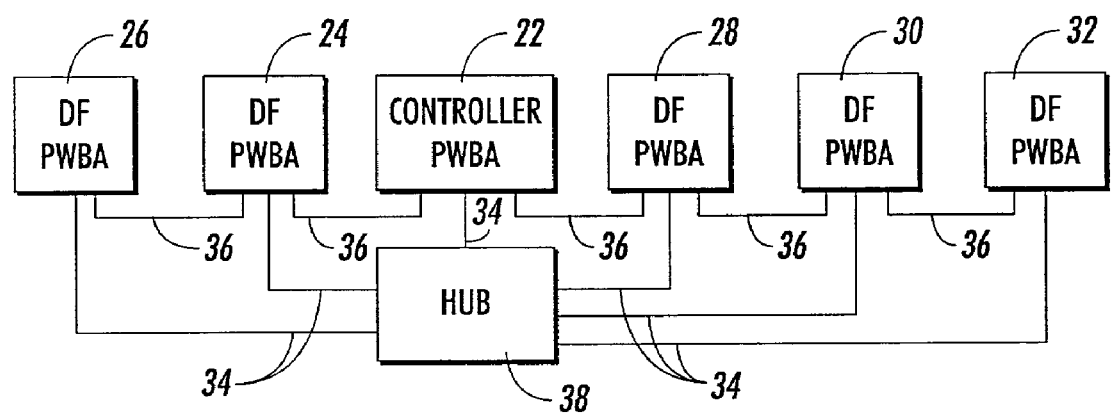
FIG. 3 is a more detailed electrical interconnection diagram of the document processing system of FIG. 1.

With reference to FIG. 3, the electrical interconnections of the document processing system of FIG. 2 are shown in greater detail. Like in FIG. 2, the electrical interconnections include the system network 34 and the control bus 36. The preferred embodiment of the system network 34 is a star topology with the controller 22 and each resource PWBA (24, 26, 28, 30, 32) connected through a hub 38 (e.g., router). The system network 34 and the hub 38 are responsible for communications between the controller PWBA 22, located in the print engine 10, and the resource PWBAs (24, 26, 28, 30, 32). The system network is a high speed communications network operating at 10 Mbps (e.g., 10 Base T Ethernet) and in one embodiment provides the capability to address from 1 to 32 independent resources.

The control bus 36 distributes discrete control signals between the controller PWBA 22 and the resource PWBAs (24, 26, 28, 30, 32) independent of network communications. In accordance with the present invention, as will be discussed in conjunction with FIG. 4, a discrete clock synchronization interrupt signal is distributed from the controller PWBA 22 to each resource PWBA (24, 26, 28, 30, 32) via the control bus 36. Each resource PWBA (24, 26, 28, 30, 32) provides isolation of the control bus 36. Each resource PWBA (24, 26, 28, 30, 32) also contains intelligence to control its own operation, including timing and functionality specifications that are specific to the particular device. The removal of a device control from the print engine control enables the integration of most any device to the print engine without having to rewrite the print engine control software.

Figure 4:
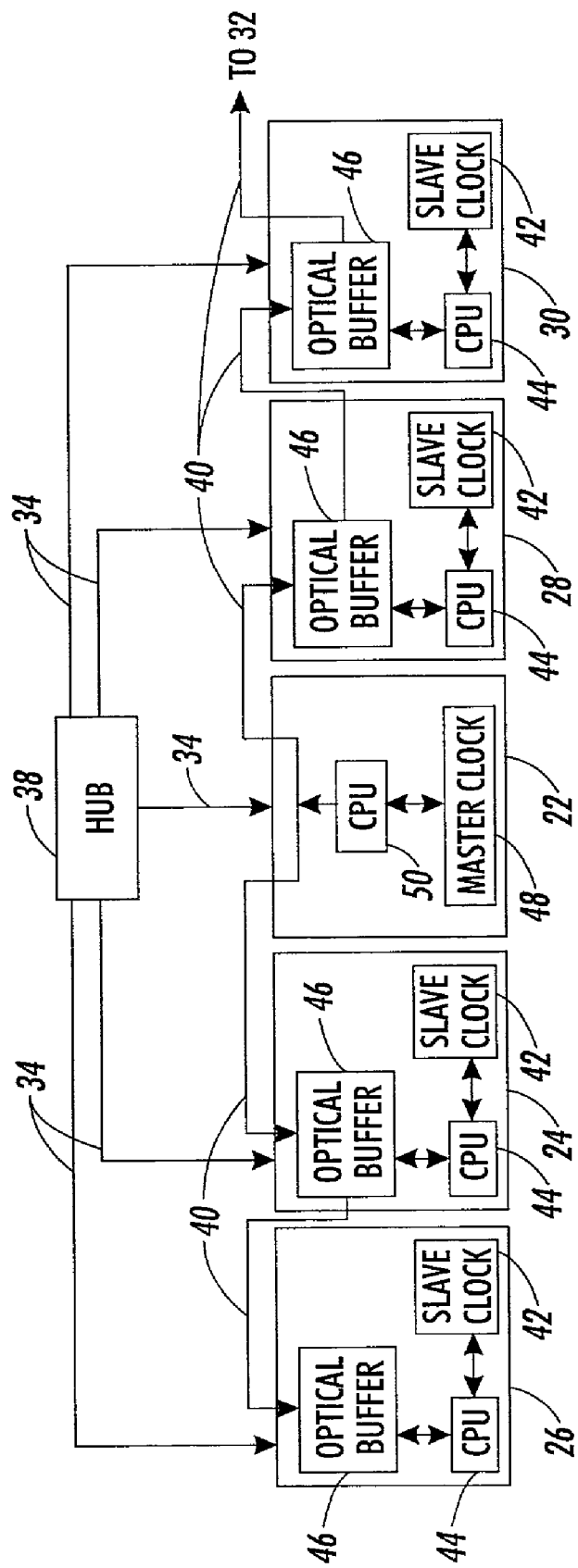
FIG. 4 is an electrical interconnection diagram showing the clock synchronization interrupt signal in accordance with the present invention.

With reference to FIG. 4, the PWBAs (22, 24, 26, 28, 30) and the control bus 36 of the document processing system of FIG. 3 are shown in greater detail. More particularly, the controller PWBA 22 includes a master clock 48 related to the operation and timing of the document processing system 10 and a CPU 50 or other circuitry for generating a discrete clock synchronization interrupt signal 40. In addition, the CPU 50 in the controller PWBA 22 responds to the operational and timing data of the master clock 48 to operate in accordance with the operation and timing requirements of the document processing system. Each resource PWBA (24, 26, 28, 30) includes a slave clock 42 related to the operation and timing of the related resource (12, 14, 16, 18) and a CPU 44 or other circuitry for responding to the discrete clock synchronization interrupt signal 40 from the controller PWBA 22. As described below, an object of the present invention is to synchronize the slave clocks 42 of the resources (12, 14, 16, 18) with the master clock 48 of the controller PWBA 22. More generally, the clock synchronization interrupt signal 40 is used to synchronize operations of all the resources (12, 14, 16, 18) with the controller 22, thereby guaranteeing proper real-time operation of the document processing system.

The clock synchronization interrupt signal 40 is one of the discrete control signals distributed via the control bus 36. More particularly, the discrete clock synchronization interrupt signal 40 is distributed from the controller PWBA 22 to the resource PWBAs (24, 26, 28, 30). Each resource must provide a one to one interconnect for the discrete control bus signals from where the signals enter the device and where they exit the device. With reference to FIG. 4, for a typical resource PWBA, the discrete clock synchronization interrupt signal 40 is optically isolated between the PWBA (24, 26, 28, 30) and the controller PWBA 22 by an optical buffer 46.

Figure 5:
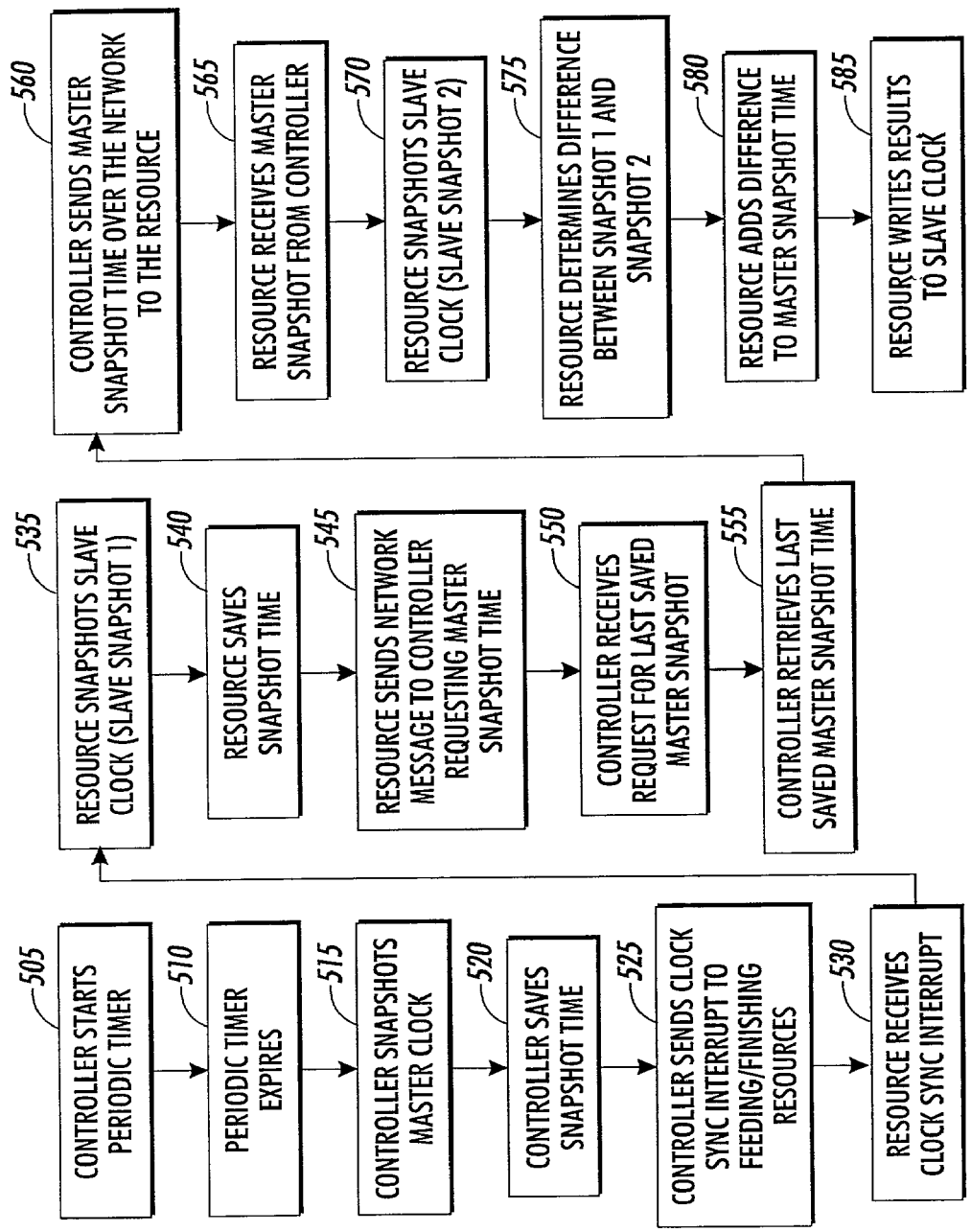
FIG. 5 is a flow chart of a first algorithm for synchronization of real-time clocks in a document processing system in accordance with the present invention.

With reference to FIG. 5, the present invention provides a first algorithm for synchronization of the slave clock 42 within the resources (12, 14, 16, 18) with the master clock 48 in the controller 22 of the document processing system. This first algorithm is performed one time during initialization of the document processing system. On startup, the controller starts a periodic timer 505. The periodic timer establishes a repetitive interval for a clock synchronization cycle (e.g., two (2) minutes) within the document processing system during steady state operations. When the periodic timer expires 510, the controller reads the current time of its master clock 515 and saves the snapshot time 520. The saved value for the master clock is referred to as Master_Clock_Snapshot_Time. Immediately after reading and saving the master clock snapshot time, the controller sends a clock synchronization interrupt signal to the feeding/finishing resources 525.

The following steps are performed by each resource (12, 14, 16, 18) configured in the document processing system upon receipt of the first clock synchronization interrupt signal 530 after startup. After receiving the discrete interrupt, the resource immediately reads the current time of its slave clock 535 and saves the snapshot time 540. The saved value is referred to as Slave_Clock_Snapshot_Time_1. Next, the resource sends a message, using the network, to the controller requesting the Master_Clock_Snapshot_Time 545 to be transmitted to it via the network.

The following steps are performed by the controller 22 each time it receives a request for the last saved Master_Clock_Snapshot_Time 550. First, the controller retrieves the last saved Master_Clock_Snapshot_Time 555. Then, the controller sends the Master_Clock_Snapshot_Time to the requesting resource over the network 560.

The following steps are performed by each resource (12, 14, 16, 18) the first time the resource receives the Master_Clock Snapshot_Time from the controller 565 after startup. First, the resource reads the current time on its slave clock 570 and saves the snapshot time. The saved value is referred to as Slave_Clock_Snapshot_Time_2. Next, the resource determines the difference between Slave_Clock_Snapshot_Time_1 and Slave_Clock_Snapshot_Time_2 575 by subtracting the first snapshot time from the second. The result is the time elapsed since the discrete clock synchronization interrupt was received. The resource then adds the difference to the Master_Clock_Snapshot_Time 580 to determine a synchronized value. Finally, the resource transfer this result (i.e., the Master_Clock_Snapshot_Time adjusted for elapsed time) to the slave clock 585 and the slave clock is set to the synchronized value. At this point the slave clock 42 is initially synchronized with the master clock 48.

Figure 6:
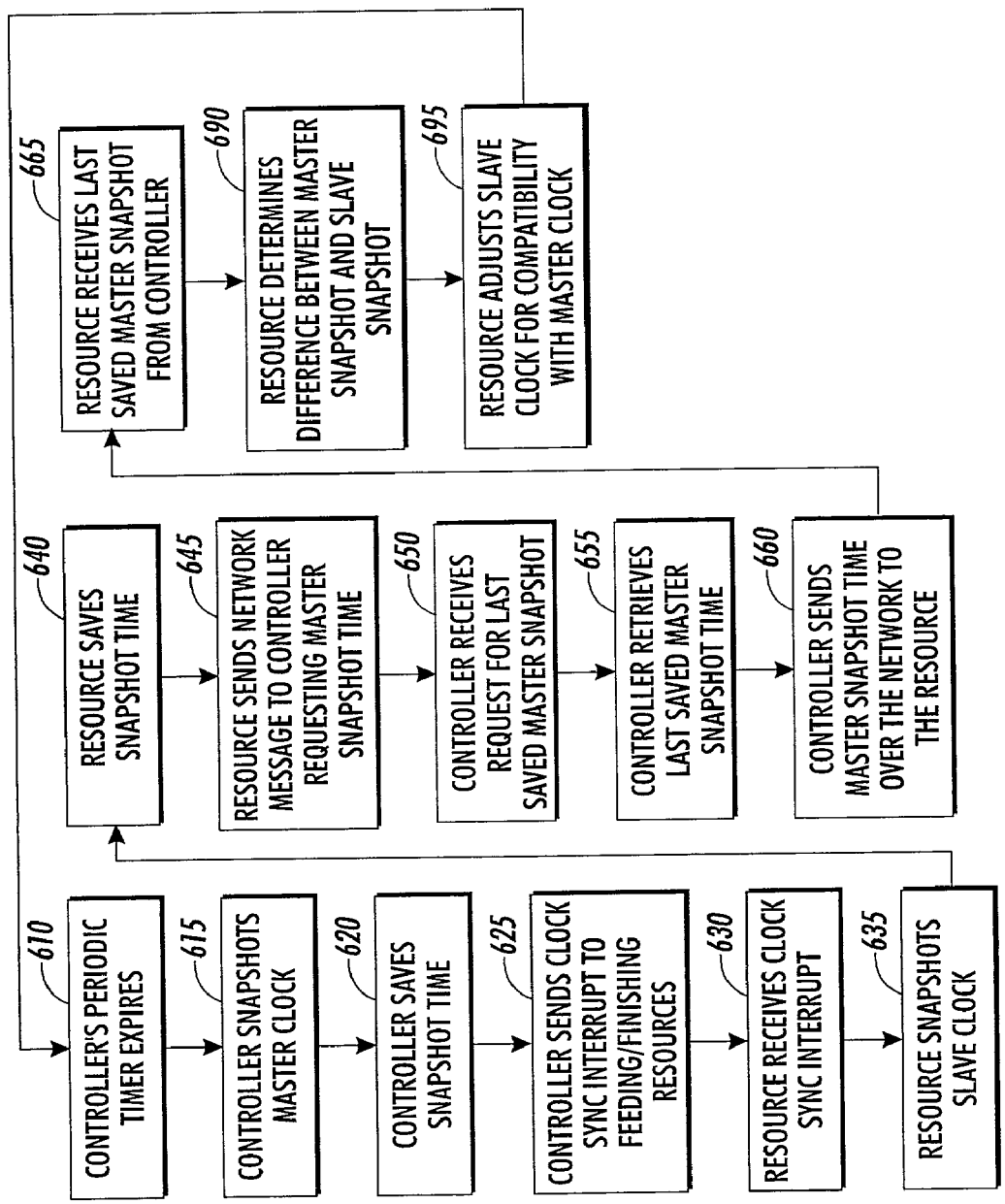
FIG. 6 is a flow chart of a second algorithm for synchronization of real-time clocks in a document processing system in accordance with the present invention.

With reference to FIG. 6, the present invention provides a second algorithm for synchronization of the slave clock 42 within the resources (12, 14, 16, 18) with the master clock 48 in the controller 22 of the document processing system. The second algorithm is performed after the initialization algorithm of FIG. 5 and periodically during steady state operations according to the clock synchronization cycle (e.g., two (2) minutes) established by the controller's periodic timer. Each time the periodic timer expires 610, the controller reads the current time of its master clock 615 and saves the snapshot time 620. The saved value for the master clock is referred to as Master_Clock_Snapshot_Time. Immediately after reading and saving the master clock snapshot time, the controller sends a clock synchronization interrupt signal to the feeding/finishing resources 625.

The following steps are performed by each resource (12, 14, 16, 18) configured in the document processing system upon receipt of the clock synchronization interrupt signal 630. After receiving the discrete interrupt, the resource immediately reads the current time of its slave clock 635 and saves the snapshot time 640. The saved value is referred to as Slave_Clock_Snapshot_Time. Next, the resource sends a message, using the network, to the controller requesting the Master_Clock_Snapshot_Time 645 to be transmitted to it via the network.

The following steps are performed by the controller 22 each time it receives a request for the last saved Master_Clock_Snapshot_Time 650. First, the controller retrieves the last saved Master_Clock_Snapshot_Time 655. Then, the controller sends the Master_Clock_Snapshot_Time to the requesting resource over the network 660.

The following steps are performed by each resource (12, 14, 16, 18) each time the resource receives the Master_Clock_Snapshot_Time from the controller 665 during steady state operations. First, the resource determines the difference between Master_Clock_Snapshot_Time and the Slave_Clock_Snapshot_Time 690 by subtracting the slave clock time from the master clock time. The result is the error between the slave clock and the master clock when the clock synchronization interrupt was received. The resource then applies an algorithm to gradually adjust the slave clock for the error 695. Once the adjustment algorithm has eliminated the error or reduced it to acceptable limits, the slave clock 42 is synchronized with the master clock 48.

The present invention enables the networked architecture of Platteter '775 to be implemented in document processing systems that provide real-time service, including hard real-time service, independent of the various configurations of feeding and finishing devices available for attachment to the print engine. Such real-time service has been demonstrated by the present invention when the real-time clocks in slave modules or resources are synchronized with the master clock in the print engine. The present invention has also demonstrated the ability to synchronize the resource clocks to within one (1) clock cycle of the master clock. Furthermore, the present invention also continues to permit development of feeding and finishing devices by third party vendors.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof

The invention claimed is:

1. A document processing system comprising:
a marking engine that marks a sheet to form at least a portion of a document, the marking engine including a controller, the controller including a master clock and logic for generating a discrete clock synchronization interrupt signal;
a resource that transfers the sheet to the marking engine or receives the sheet from the marking engine, the resource including a slave clock related to operational timing of the resource and circuitry for receiving and processing the discrete clock synchronization interrupt signal; and
a control bus, interconnecting the resource and the controller, for distributing the discrete clock synchronization interrupt signal.

2. The document processing system of claim 1 wherein the resource circuitry includes a processor for determining the compatibility of the slave clock with the master clock.

3. The document processing system of claim 1 wherein the resource circuitry includes a processor for adjusting the slave clock to provide for compatibility with the controller.

4. The document processing system of claim 3 wherein the compatibility between the resource and the controller provides hard real-time service.

5. The document processing system of claim 3 wherein the compatibility between the resource and the controller is such that the slave clock is synchronized to within one (1) clock cycle of the master clock.

6. The document processing system of claim 1, including a plurality of resources, each resource including a slave clock related to operational timing of the resource and circuitry for receiving and processing the discreet clock synchronization interrupt signal, and wherein the control bus interconnects each resource with the controller thereby distributing the discreet clock synchronization interrupt signal to each resource.

7. The document processing system of claim 6 wherein the circuitry in each resource includes a processor for adjusting the slave clock associated with the resource to provide for compatibility with the controller.

8. The document processing system of claim 7 wherein the compatibility between the resources and the controller provides hard real-time service.

9. The document processing system of claim 7 wherein the compatibility between the resources and the controller is such that each slave clock is synchronized to within one (1) clock cycle of the master clock.

10. The document processing system of claim 6 wherein the resources include one or more finishing devices.

11. The document processing system of claim 6 wherein the resources include one or more feeding devices.

12. The document processing system of claim 6, further including a 10 base T network for interconnecting the resources and the controller.

13. In a document processing system comprising a marking engine that marks a sheet to form at least a portion of a document, the marking engine further including a controller, the controller further including a master clock, a resource that transfers the sheet to the marking engine or receives the sheet from the marking engine, the resource further including a slave clock related to operational timing of the resource, and electrical interconnections connecting the resource to the controller, the electrical interconnections further including a control bus and a network, a method of initially synchronizing the slave clock with the master clock comprising the steps of:
a) saving a value of the master clock in the controller;
b) generating a discrete clock synchronization interrupt signal in the controller and distributing the discrete clock synchronization interrupt signal to the resource via the control bus;
c) receiving the discrete clock synchronization interrupt signal at the resource and saving a first value of the slave clock;
d) sending a message from the resource to the controller via the network to request the value saved for the master clock;
e) sending the value saved for the master clock from the controller to the resource via the network;
f) receiving the value saved for the master clock at the resource;
g) saving a second value of the slave clock in the resource;
h) subtracting the first value from the second value to determine a slave clock difference value; and
i) adding the difference value to the value saved for the master clock to determine a synchronized value for the slave clock and setting the slave clock to the synchronized value.

14. The method of claim 13, the document processing system including a plurality of resources, each resource further including a slave clock related to operational timing of the resource, and the electrical interconnections further connecting each resource to the controller via the control bus and the network, wherein steps c) through i) are performed for each resource.

15. In a document processing system comprising a marking engine that marks a sheet to form at least a portion of a document, the marking engine further including a controller, the controller further including a master clock, a resource that transfers the sheet to the marking engine or receives the sheet from the marking engine, the resource further including a slave clock related to operational timing of the resource, and electrical interconnections connecting the resource to the controller, the electrical interconnections further comprising a control bus and a network, a method of synchronizing the slave clock with the master clock during steady state operation of the document processing system comprising the steps of:

a) saving a value of the master clock in the controller;
   b) generating a discrete clock synchronization interrupt signal in the controller and distributing the discrete clock synchronization interrupt signal to the resource via the control bus;
   c) receiving the discrete clock synchronization interrupt signal at the resource and saving a value of the slave clock;
   d) sending a message from the resource to the controller via the network to request the value saved for the master clock;
   e) sending the value saved for the master clock from the controller to the resource via the network;
   f) receiving the value saved for the master clock at the resource; and
   g) subtracting the value saved for the slave clock from the value saved for the master clock to determine an error value between the slave clock and the master clock and using the error value in an adjustment algorithm to adjust the slave clock to be synchronized with the master clock.

16. The method of claim 15 wherein step g) results in synchronization of the slave clock to within one (1) clock cycle of the master clock.

17. The method of claim 15 wherein steps a) through g) are performed periodically during steady state operation of the document processing system.

18. The method of claim 17 wherein the periodic interval for performing steps a) through g) during steady state operation of the document processing system is about two seconds.

19. The method of claim 15, the document processing system including a plurality of resources, each resource further including a slave clock related to operational timing of the resource, and the electrical interconnections further connecting each resource to the controller via the control bus and the network, wherein steps c) through g) are performed for each resource.

20. The method of claim 19 wherein step g) results in synchronization of each slave clock to within one (1) clock cycle of the master clock.

21. An electrophotographic document processing system, operated in a xerographic environment, comprising:

a marking engine that marks a sheet to form at least a portion of a document, the marking engine including a controller, the controller including a master clock and logic for generating a discrete clock synchronization interrupt signal;
   a plurality of resources, each resource is associated with transfer of the sheet to the marking engine or receipt of the sheet from the marking engine, each resource including a slave clock related to operational timing of the resource and logic for receiving the discrete clock synchronization interrupt signal, processing the discrete clock synchronization interrupt signal, and synchronizing the slave clock with the master clock; and
   electrical wiring interconnecting the resources and the controller for distributing the discrete clock synchronization interrupt signal to the resources.

* * * * *